Patented June 4, 1929.

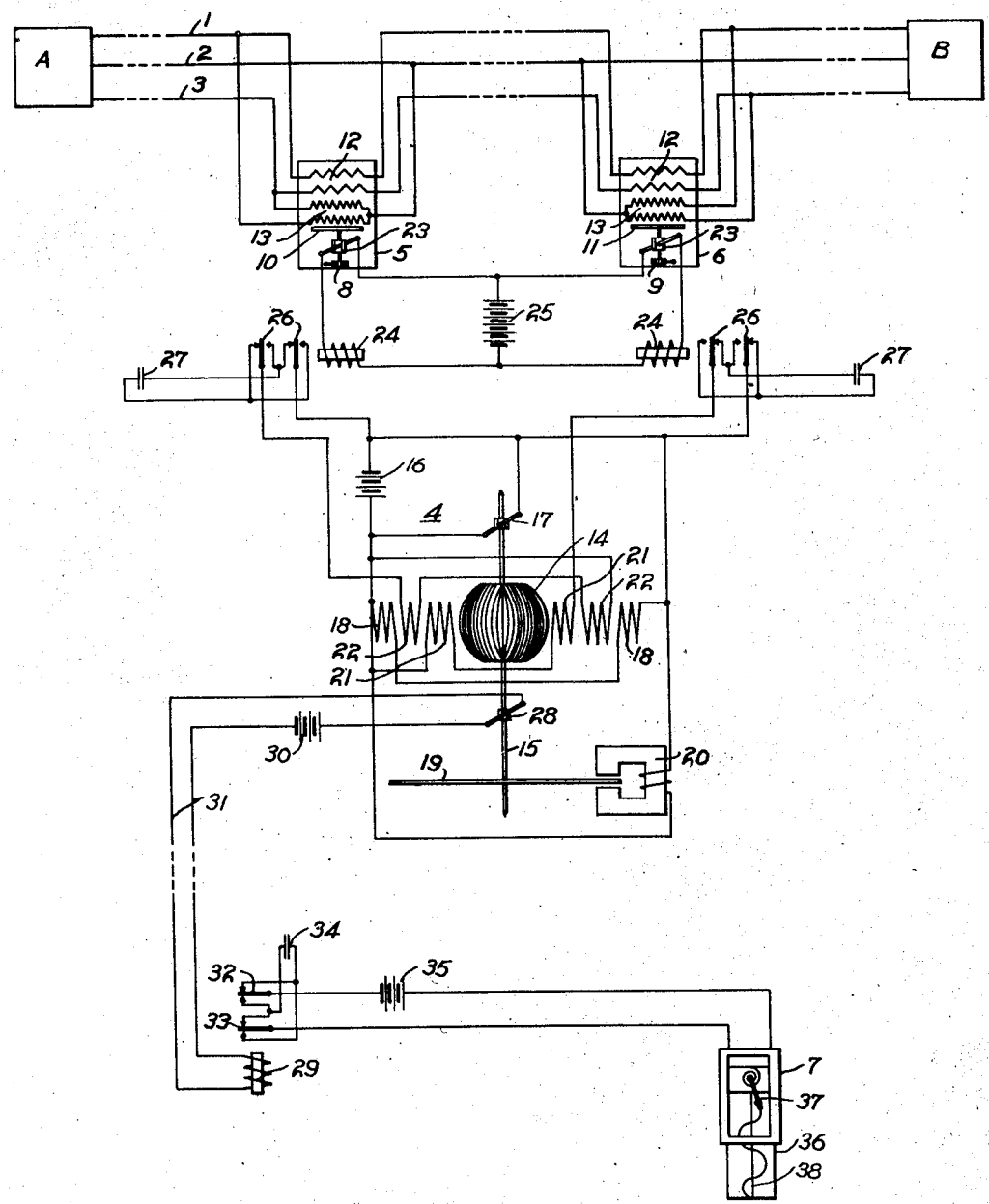

1,715,728

UNITED STATES PATENT OFFICE.

GRIFFIN G. WAITE, OF WILKINSBURG, PENNSYLVANIA, ASSIGNOR TO WESTINGHOUSE ELECTRIC & MANUFACTURING COMPANY, A CORPORATION OF PENNSYLVANIA.

REMOTE METERING SYSTEM.

Application filed July 15, 1927. Serial No. 205,926.

My invention relates to remote metering systems and has particular reference to a system for recording or indicating the direction or magnitude, or both, of a quantity in a region remotely located with respect to the path traversed by said quantity.

My invention relates more particularly to a system embodying a center zero recorder or indicator actuated in accordance with the magnitude of electrical power and direction of transfer thereof between a plurality of sources therefor preferably remotely located with respect to the region occupied by the center zero recorder.

In accordance with the aforesaid purpose, I increase or decrease the speed of a driven device in accordance with the direction and magnitude of electrical power and energize the center zero recorder in accordance with the speed of the driven device.

It is characteristic of my invention that a graphic record is continuously produced of the exact amount of power or other electrical quantity, i. e., reactive power or volt amperes delivered by one power station to another connected power station for any given period of time. It is further characteristic of my invention that an existing telephone or telegraph line may be utilized for the purpose of my invention without interfering with or affecting its operation per se.

My invention resides in the method and apparatus of the character hereinafter described and claimed, the foregoing and further characteristics of my invention being determinable from the following description.

For a fuller understanding of my method and for a description of one form my apparatus may take, reference is to be had to the accompanying drawing, in which The figure is an elementary diagrammatic view of a remote metering system constructed in accordance with my invention.

Referring to the drawing, A and B represent two sources of electrical supply or local power systems each comprising a number of generating stations tied together in the usual manner. Power may be transmitted in either direction between the systems A and B by means of electrical conductors 1, 2 and 3, such as are ordinarily used in the transfer of three-phase alternating current from a suitable type of generator to a suitable type of receiver. The local systems A and B may form a portion of the equipment of an interconnected system comprising a number of local systems. In such an arrangement, it is necessary to have a knowledg of the direction and magnitude of the power flow in order that load dispatching and frequency control shall be successfully effected. Either one or both of the stations mentioned above may include frequency changing equipment, or rotary converting machinery.

The speed of the driven device, such as a direct current motor meter 4 is adapted to be changed in any suitable manner in accordance with the magnitude of the power transferred between the stations A and B. To this end, there may be utilized energizing and deenergizing impulses derived from a plurality of rotational circuit contact making devices provided on watthour meters 5 and 6. A recording and indicating device, for example, a zero center receiver 7 is energized in accordance with the speed of the driven device 4 by electrical impulses generated in accordance with the speed of the driven device 4 to indicate the direction and magnitude of the power transferred between stations A and B.

The watthour meters 5 and 6 are provided with rotation-limiting mechanism such as ratchet and pawl devices 8 and 9 mounted so as to restrict the rotation of the meters in opposite directions. The watthour meters 5 and 6 may be of any suitable type, such as those ordinarily used to measure power. The watthour meter 5 and the watthour meter 6 are adapted to rotate in opposite directions, that is, when power is transmitted from A to B, the watthour meter 5, for example, rotates in clockwise direction, and meter 6 remains stationary, whereas when power is transmitted from B to A, the watthour meter 6 rotates in counter-clockwise direction and meter 5 remains stationary. The ratchet and pawl devices 8 and 9 co-operate with the armatures 10 and 11 of the meters 5 and 6 to prevent rotation in an improper direction. The watthour meters 5 and 6 are provided with current coils 12 and voltage coils 13 that are connected in circuit relation with the conductors 1, 2 and 3 in the usual manner for the purpose desired.

The watthour meters 5 and 6 change the speed of the motor meter 4 in accordance with the magnitude and direction of the power transferred between stations A and B. For this purpose, for example, the motor meter 4 comprises a field coil 14 mounted on a shaft 15, the coil being suitably energized, as by a battery 16 in series circuit relation therewith through a commutator 17 mounted on the shaft 15 of the motor meter 4. A stationary field coil 18 is also energized by the battery 16 and the resulting flux coacts with the flux produced by winding 14 to effect a substantially constant base speed of rotation of the shaft 15. The meter 4 is provided with a load in the form of a damping disk 19 mounted thereon, that is adapted to be rotationally braked by an electromagnet 20 that is energized by the battery 16.

The speed of the shaft 15 of the motor meter 4 is increased or diminished in accordance with the direction of the power transferred between A and B, and at a rate substantially in accordance with the magnitude of the energy transferred by the energizing or deenergizing action of the stationary field produced by the energization of the stationary winding 18. Such result may be accomplished in any convenient manner; for example, there may be provided an auxiliary stationary field coil 21, cumulatively wound, which is adapted to strengthen the field set up by coils 18, and a stationary field coil 22, differentially wound, which is adapted to weaken the field set up by coils 18. For this purpose, each of the watthour meters is provided with a contact making device 23 that is adapted to energize an electromagnet 24 in series circuit relation with a source of electrical supply, such as a battery 25. The electromagnets 24 are provided with a plurality of contact making armatures 26 that are adapted to charge and discharge a condenser 27 from the battery 16 through their respective energizing and deenergizing stationary windings.

The operation of the electromagnets 24 in connection with the condensers 27 is well known in the art and requires no further description.

In accordance with my invention, the zero center recording receiver 7 is controlled in accordance with the speed of shaft 15 by impulses generated by a contactor 28 mounted on the shaft 15 and adapted to energize an electromagnet 29 from a source of electrical supply, such as a battery 30, in series circuit relation with the contactor 28 and the electromagnet coil 29 through a pair of conductors 31 that may, for example, be an existing telephone or telegraph line, or other suitable long line.

The electromagnet 29 actuates a plurality of armatures or contacts 32 and 33 to cause a condenser 34 to charge and discharge through the meter 7 that is in series circuit relation with a battery 35. The zero center receiver 7 may be of any suitable type that is operable by impulses and may, for example, consist of a paper chart 36, that is moved at a constant speed with respect to a marker 37, which is, in turn, moved to a position indicative of the speed of rotation of the motor meter 4 by impulses permitted to flow through the contactor 28. The recording chart 36, preferably, is provided with a zero center line 38 to indicate the base speed at which the shaft 15 of the motor meter 4 is driven. The operating mechanism of the meter 7 is calibrated so that the marker 37 marks a line directly over the center line 38 when no power is transmitted between the stations A and B, the motor meter 4, under such circumstances, being normally energized. However, if energy is transmitted, for example, from A to B the marker 37 is moved to one side of the center line 38 and when power is transmitted from B to A the marker 37 is moved to the other side of said center line.

Normal operation of the device is as follows:

Assume, for example, that the station or system A is generating power at a higher rate than the station or system B. In such case, power may be said to flow from station A to station B. Such flow of power causes the watthour meter 5 to rotate at a speed that is proportional to the magnitude of the power flowing from station A to B. Watthour meter 6 tends to rotate in a manner similar to watthour meter 5 but is prevented from such rotation by the ratchet and pawl mechanism 9. Therefore, when power flows from A to B, the watthour meter 6 and all circuits interconnected therewith including the stationary winding 21 are inoperable. Coming back to the operation of the watthour meter 5, the contactor 23 energizes the electromagnet 24 in accordance with the speed of rotation of the armature 10 of the watthour meter 5 which, in turn, operates the armatures 26 that send impulses from the condenser 27 through the differential stationary windings 22 of the motor meter 4 to oppose the magnetic effect of the stationary field of the motor meter 4 which causes the shaft 15 to rotate at a greater rate than its base speed. Such increase in speed of the shaft 15 is proportional to the magnitude of the power flowing from station A to station B. This increase in speed increases the number of impulses generated in the line 31 which, in turn, increases the rate of operation of armatures 32 and 33 thereby causing the marker 37 of the meter 7 to be energized to move to a position that is proportional to the flow of energy from the station A to station B.

When power ceases to flow from station A to station B both the watthour meters 5 and 6 cease to operate permitting the shaft 15 to be driven at the hereinbefore mentioned predetermined base speed by the battery 16. Such base speed as explained, is adapted to cause the marker 37 to take a position that marks a line that substantially coincides with the zero center line 38.

When power flows from the station B to station A, watthour meter 6 rotates in accordance with the magnitude of the power transfer, while watthour meter 5 is held stationary by its ratchet and pawl mechanism 8. In this case, the impulses received by the operation of the armatures 26 and the cumulative stationary windings 21 are in such a direction as to aid the magnetic effect of the stationary field of the motor meter 4 to thereby cause the shaft 15 to decrease its speed of rotation substantially in accordance with the magnitude of power transmitted from station B to station A. Such a decrease in the rotation of the shaft 15 causes the contactor 28 to send impulses at a decreased rate which, in turn, causes the marker 37 of the meter 7 to take a position on the opposite side of the zero center line at a distance that is proportional to the rate of impulses generated by the rotation of the shaft 15.

The zero center meter 7 is calibrated in terms of the magnitude of the quantity transmitted between the sources of quantity supply, in this case, sources of electrical supply transmitting electrical power and a graphic record is made of the magnitude and direction of the power flow between the two sources of supply. Also a record of the direction of the power flow is made by the marker and may be observed by reference to the zero center line. The magnitude and direction of power flow between stations A and B may be obtained for any previous time by reference to the chart 36. Also the total amount of power transmitted from one station to the other may be determined for any previous given interval of time by reference to the chart 36.

It is to be understood that the recorder 7 indicates the magnitude and direction of power flow between the stations A and B as well as records such power flow.

In accordance with my invention, the meter 7 may be located at one of the sub-stations comprised in a local power system A or B and the deflecting member 37 may be suitably utilized as by coaction with adjacent contacts of an electrical circuit, to control the generation of power in said sub-station and consequent interchange of power between the systems A and B.

Various changes and modifications may be made in my invention without departing from the spirit and scope thereof, as set forth in the appended claims.

I claim as my invention:

1. The combination with a plurality of connected electrical energy sources, of means for indicating the direction and magnitude of a quantity flowing between said sources comprising a driven device, means for changing the speed of said device substantially in accordance with the direction and magnitude of said quantity, and deflecting means responsive to the speed of said device.

2. The combination with a plurality of connected electrical energy sources, of means for indicating the direction of a quantity flowing between said sources comprising a driven device, means for changing the speed of said device substantially in accordance with the direction of said quantity, and means responsive to the speed of said device for performing an indicating function.

3. The combination with a plurality of connected electrical sources, of means for indicating the magnitude and direction of a quantity flowing between said sources comprising a driven device, means for changing the speed of said device substantially in accordance with the magnitude of said quantity, and means responsive to the speed of said device for performing an indicating function.

4. The combination with a plurality of connected electrical sources, of means for indicating the direction and magnitude of electrical energy flowing between said sources comprising a driven device, means for changing the speed of said device substantially in accordance with the direction and magnitude of said energy, and deflecting means responsive to the speed of said device.

5. The combination with a plurality of connected electrical energy sources, of means for indicating the direction of electrical energy flowing between said sources comprising a driven device, means for changing the speed of said device substantially in accordance with the direction of said energy, and deflecting means responsive to the speed of said device.

6. The combination with a plurality of connected electrical sources, of means for indicating the direction and magnitude of a quantity transferred between said sources including an electric motor, and means including a watthour meter for actuating said motor.

7. The combination with a plurality of connected electrical sources, of means including an electric motor for indicating the direction and magnitude of a quantity transferred between said sources, and means including a plurality of meters rotational only unidirectionally for actuating said motor.

8. The combination with a plurality of connected electrical sources, of means for indicating the direction and magnitude of a quantity transferred between said sources including an electric motor, a plurality of meters rotational only unidirectionally, and means for changing the speed of said motor in accordance with the rotation of said meters.

9. The combination with a plurality of connected electrical sources, of means including an electric motor for indicating the direction and magnitude of a quantity transferred between said sources, and means including a plurality of watthour meters operable in accordance with the direction in which said quantity is transferred for actuating said motor.

10. The combination with a plurality of connected electrical sources, of means for indicating the direction and magnitude of a quantity transferred between said sources, means including a plurality of watthour meters severally operable in accordance with the direction of said transferred quantity, a driven device, and means for changing the speed of said driven device in accordance with the rotation of said meters.

11. The method of indicating the magnitude and direction of a quantity derived from an electrical circuit which comprises changing the speed of a driven device in accordance with the magnitude and direction of the quantity and actuating an indicator in accordance with the speed of the device.

12. The method of indicating the magnitude and direction of the energy flowing in an electrical circuit which comprises changing the speed of a driven device in accordance with the magnitude and direction of said energy and actuating an indicator in accordance with the speed of said device.

13. The method of indicating the magnitude and direction of a quantity traversing an electrical circuit which comprises translating said quantity into electrical impulses, and changing the speed of a driven device in accordance with the rate of said impulses and actuating an indicator in accordance with the speed of said device.

14. The method of indicating the magnitude and direction of a quantity traversing an electrical circuit which comprises decreasing the speed of a driven device in accordance with the magnitude of said quantity when said quantity traverses said circuit in one direction, and increasing the speed of said device in accordance with the magnitude of said quantity when said quantity traverses said circuit in another direction and indicating the speed of said driven device.

In testimony whereof, I have hereunto subscribed my name this 7th day of July, 1927.

GRIFFIN G. WAITE.